United States Patent Office 3,729,387
Patented Apr. 24, 1973

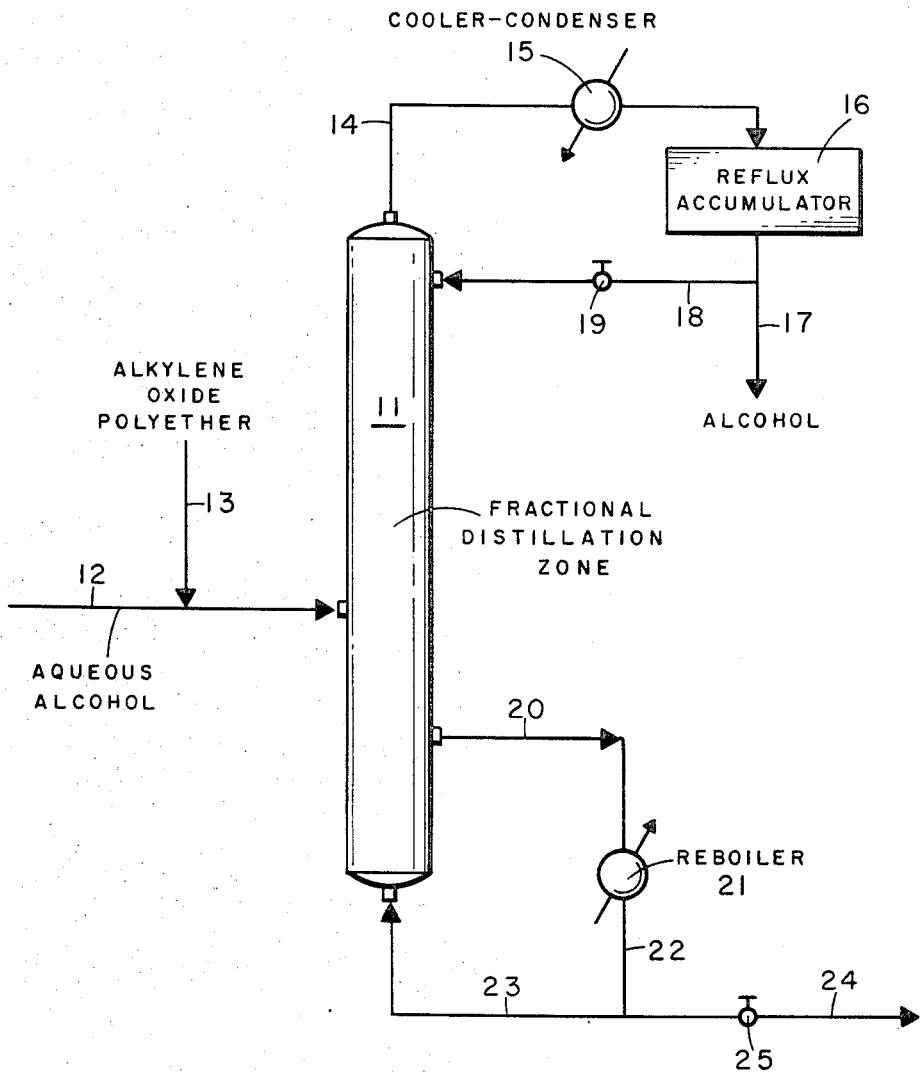

3,729,387
DISTILLATION OF WATER AND ALCOHOL WHILE PREVENTING FOAMING AND FORMATION OF EMULSIONS
John H. Naschke and Eugene O. Keil, Houston, Tex., assignors to Esso Research and Engineering Company
Original application Feb. 6, 1970, Ser. No. 9,440, now abandoned. Divided and this application July 8, 1971, Ser. No. 160,895
Int. Cl. C07c 29/26
U.S. Cl. 203—19                  5 Claims

ABSTRACT OF THE DISCLOSURE

Foaming and emulsion formation in an aqueous alcohol solution are prevented during separation of water and alcohol by heating the solution to a temperature within the range of about 90° F. to about 350° F. at pressures within the range from about atmospheric to about 300 p.s.i.g. in the presence of a small but effective amount of an alkylene oxide polyether containing about 25 to about 175 moles of propylene oxide and about 5 to about 235 moles of ethylene oxide and having a molecular weight of about 3,000 to about 10,000, the propylene oxide being in a major amount and sufficient of the combined oxides being employed to provide a molecular weight in the range given.

CROSS-REFERENCE TO RELATED APPLICATION

This application is a division of S.N. 9,440, filed Feb. 6, 1970, and now abandoned, for John H. Naschke and Eugene O. Keil and entitled "Separation of Water and Alcohol While Preventing Foaming and Formation of Emulsions."

BACKGROUND OF THE INVENTION

(1) Field of the invention

The present invention is directed to the prevention of foaming and emulsion formation in an aqueous alcoholic solution. More particularly, the invention is concerned with the prevention of foaming and emulsion formation in the separation of water and alcohol from an aqueous alcoholic solution. In its more specific aspects, the invention is concerned with the separation of water and alcohol by heating the solution such as during distillation in the presence of an alkylene oxide polyether.

(2) The prior art

It has been known heretofore to break petroleum emulsions by adding certain demulsifiers thereto. Thus, it has been known that certain polyol ethers have been used in breaking petroleum emulsions.

It is also known that foaming in industrial operations such as in the manufacture of pulp and paper, and the manufacture and use of latex paints may be suppressed by adding compositions including three ingredients in which one is a polyethylene glycol monoester of a fatty acid. It is also known to control foaming to use a composition containing reaction products of oleyl alcohol with ethylene oxide units. Likewise, anti-foam agents have been employed derived from distillation of oleyl alcohol and the mono-oleate ester of a polyethylene glycol having an average molecular weight of 400. However, in the manufacture of alcohol and in concentration thereof in water separation there is a problem of internal alcohol-water-emulsion-foaming, the application of commercial defoamers has failed to provide a useful process in that foaming and emulsion were not suppressed. The present invention is, therefore, unobvious and advantageous and quite useful in providing a method for separating alcohol and water and preventing foaming and emulsion formation therein by heating the alcoholic solution in the presence of a particular anti-foaming and demulsification agent.

Prior art considered with respect to this invention includes the following listed U.S. patents:

| U.S. 2,353,700 | U.S. 2,602,077 |
| U.S. 2,572,885 | U.S. 2,727,827 |
| U.S. 2,572,886 | U.S. 2,843,551 |
| U.S. 2,573,893 | U.S. 2,903,432 |
| U.S. 2,602,056 | U.S. 3,408,306 |

SUMMARY OF THE INVENTION

The present invention may be briefly described and summarized as a method for preventing foaming and formation of emulsions in an aqueous solution containing from about 1% to about 60% by volume of aliphatic saturated alcohol having from 1 to 6 carbon atoms in the molecule wherein the solution is heated to a temperature within the range from about 90° to about 350° F. at pressures from about atmospheric to about 300 p.s.i.g. in the presence of a small but effective amount of an alkylene oxide polyether containing about 25 to about 175 moles of propylene oxide and about 5 to about 235 moles of ethylene oxide and having a molecular weight of about 3,000 to about 10,000, preferably from about 3,000 to about 7,000, the propylene oxide being in a major amount and sufficient of the combined oxides being used to provide the desired molecular weight. Quite desirable results are obtained with an alkylene oxide polyether having a molecular weight of about 5,000. The heating is suitably conducted to distill water from alcohol or extract the alcohol from water.

BRIEF DESCRIPTION OF THE DRAWING

The present invention will be further illustrated by reference to the single figure of the drawing.

VARIABLES OF THE INVENTION

The aliphatic alcohols which may be used in the present invention include the aliphatic saturated alcohols having from 1 to 6 carbon atoms in the molecule and include methyl and ethyl alcohol, isopropyl and propyl alcohol, the butanols, pentanols, and hexanols.

Preferred alcohols are ethyl alcohol and isopropyl alcohol.

The alkylene oxide polyether is preferably one having a molecular weight of about 5,000. The alkylene oxide polyether may have a molecular weight from about 3,000 to about 10,000.

The alkylene oxide polyether may be formed from a glycol such as propylene glycol by reaction with propylene oxide followed by a reaction with ethylene oxide in accordance with the following equation:

R[OH]$_x$ + $m$(OCH$_2$CHCH$_3$)
polyglycol 1, 2 propylene oxide
+ $mo$(OCH$_2$CH$_2$)
ethylene oxide

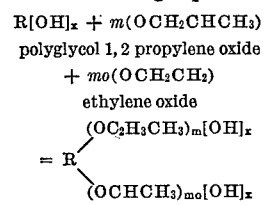

where R[OH]$_x$ is an alkylene glycol, and $x$ is 1 to 6, and $m$ is the number of mols 25–175 of propylene oxide, and $mo$ is the number of moles 5–235 of ethylene oxide. The propylene oxide is employed in a major amount and sufficient of the combined oxides being used to provide the molecular weight in the range given.

Specific alkylene oxide polyethers which are useful in the present invention are: polypropylene glycol ether and triethylene glycol ether.

The alcoholic solution which is heated in accordance with the present invention to separate water therefrom may contain from about 1 to about 60% by volume of alcohol. An aqueous solution of an aliphatic saturated alcohol containing about 15% to 30% by volume of alcohol is preferred.

The aqueous alcoholic solution is heated to a temperature within the range of about 90 to 350° F. at pressures within the range from about atmospheric to about 300 p.s.i.g. in the presence of the alkylene oxide polyether. When ethyl alcohol is the alcohol, the temperature to which the aqueous solution is heated may range from about 90° to about 260° F. with a preferred temperature at about 120° F. at pressures of about 20 to about 100 p.s.i.g.

The amount of alkylene oxide polyether employed may range from about 0.01% to about 2.0% by weight of the aqueous alcoholic solution. It is preferred, however, to use about 0.015% to about 0.020% by weight of the alkylene oxide polyether.

During the separation of alcohol and water and for heating purposes and as desirable for stripping operations, a heated gas such as nitrogen, steam, methane, and the like may be sparged into the vessel containing the alcoholic solution in which the defoaming and demulsification agent is present in the alcoholic solution. The gas when employed may be introduced into the solution at a rate of about 5 to about 15% by weight of the feed solution. The amount of gas may be sparged into the aqueous solution at a rate just below cavitation.

DESCRIPTION OF THE DRAWING

Referring now to the drawing numeral 11 designates a fractional distillation zone which may be comprised of one or more distillation towers equipped with suitable internal vapor-liquid contacting means (not shown) such as bellcap trays and the like and all other auxiliary equipment usually associated with distillation towers. Leading into zone 11 about midpoint thereof is line 12, by way of which an aqueous alcoholic solution of ethyl alcohol is fed. Line 13 connects to line 12 for introduction thereinto in accordance with the present invention alkylene oxide polyether of selected molecular weight in a selected amount.

In zone 11, the alcohol, which suitably may be ethyl alcohol, is removed by line 14 containing a cooler-condenser 15 and discharged into a reflux accumulator 16; the alcohol in accumulator 16 is withdrawn and recovered by line 17 and a portion thereof may be pumped back as reflux to the top of zone 11 by line 18 controlled by valve 19.

Heat is introduced into zone 11 by withdrawing a bottoms aqueous stream by line 20 into a reboiler 21. A portion of the heated aqueous stream is returned to zone 11 by lines 22 and 23 and water is discharged from the system by line 24 controlled by valve 25. The water discharged by line 24 may be suitably cooled or used for heat exchange. The alkylene oxide polyether is contained in the water withdrawn by line 20.

When one distillation tower is employed, means may be provided to vent non-condensibles from reflux accumulator 16 and a sufficient number of bellcap trays are used in the fractionation tower for efficient fractionation. When two distillation towers are employed, the non-condensibles may be discharged from the top of the first tower and the alcohol recovered from the top of the second tower. In either instance, it may be desirable to feed a portion of the alkylene oxide polyether into the reflux stream returned to the tower(s).

DESCRIPTION OF THE BEST MODES

In order to illustrate the invention further, an alcoholic solution containing 1–20% by volume of ethyl alcohol is obtained. One hundred mls. of the alcoholic solution at a temperature of 90° F. at atmospheric pressure is introduced into a graduate and a sparging tube with a medium range, fritted tip is introduced to the bottom of the graduate. Nitrogen gas is passed through the sparging tube at a rate just below cavitation which is about 100% by volume of the alcohol solution. The alcohol foams and may overflow the vessel. When 0.1 ml. or 0.1% of an alkylene oxide polyether having a molecular weight of about 5,000 is present in the alcoholic solution, the emulsion does not form and foaming is suppressed to the extent that no foam is formed greater than that when water is sparged.

In another mode of the present invention, an aqueous ethyl alcohol solution containing 12% by volume of alcohol, but which may be within the range of about 1% to about 30% by volume of alcohol, in a distillation vessel is heated during distillation at a temperature of about 140° F. to about 300° F. at a pressure of about 20 to about 80 p.s.i.g. in the presence of the alkylene oxide polyether of a molecular weight of about 5,000. During the distillation operation, emulsion formation and foaming were suppressed and distillation proceeded without difficulty. When the alkylene oxide polyether is not present, foaming and emulsion formation interfere with the separation of water from the alcohol.

The nature and objects of the present invention having been completely described and illustrated and the best mode contemplated set forth, what we wish to claim as new and useful and secure by Letters Patent is:

1. A method of separating water from an aqueous solution of an aliphatic alcohol containing from about 1% to about 30% of an aliphatic saturated alcohol having 2 to 3 carbon atoms in the molecule which emulsifies and foams on distillation which comprises:
    distilling said aqueous solution at a temperature between about 140° F. to about 300° F. at a pressure within the range from 20 p.s.i.g. to about 80 p.s.i.g. in the presence of a small but effective amount within the range from about 0.01 to about 2.0 percent by weight based on the aqueous solution of an alkylene oxide polyether consisting of about 25 to about 175 moles of propylene oxide and about 5 to about 235 moles of ethylene oxide and having a molecular weight within the range of about 3,000 to about 10,000, the propylene oxide being in a major amount and sufficient of the combined oxides being employed to provide said molecular weight;
    whereby said foaming and emulsion formation are suppressed.

2. A method in accordance with claim 1 in which the aqueous solution contains about 12% by volume of ethyl alcohol.

3. A method in accordance with claim 1 in which the molecular weight is about 5,000.

4. A method in accordance with claim 1 in which the aqueous solution contains propyl alcohol.

5. A method in accordance with claim 1 in which:
    (a) the aqueous solution contains about 12% by volume ethyl alcohol;
    (b) the molecular weight is about 5,000.

References Cited

UNITED STATES PATENTS

| | | | |
|---|---|---|---|
| 2,777,807 | 1/1957 | Pyle et al. | 252—321 X |
| 2,727,867 | 12/1955 | Denman | 252—321 |
| 2,808,378 | 10/1957 | Baldwin et al. | 252—321 |
| 3,142,628 | 7/1964 | Phillips. | |

NORMAN YUDKOFF, Primary Examiner

D. EDWARDS, Assistant Examiner

U.S. Cl. X.R.

203—18, 20; 252—321, 358